(12) United States Patent
Shogan et al.

(10) Patent No.: US 7,826,212 B2
(45) Date of Patent: Nov. 2, 2010

(54) THERMAL CONTROL THROUGH A CHANNEL STRUCTURE

(75) Inventors: Gregory Shogan, Round Rock, TX (US); John Maynard Dunham, Kechi, KS (US)

(73) Assignee: LSI Corporation, Milpitas, CA (US)

( * ) Notice: Subject to any disclaimer, the term of this patent is extended or adjusted under 35 U.S.C. 154(b) by 429 days.

(21) Appl. No.: 11/413,853

(22) Filed: Apr. 27, 2006

(65) Prior Publication Data

US 2008/0049388 A1 Feb. 28, 2008

(51) Int. Cl.
*G06F 1/20* (2006.01)
*H05K 5/00* (2006.01)
*H05K 7/20* (2006.01)

(52) U.S. Cl. .................................. 361/679.46

(58) Field of Classification Search ........... 361/687, 361/695–697, 679.46, 679.47, 679.49, 688, 361/690, 701, 704, 707, 709, 714–716; 454/184
See application file for complete search history.

(56) References Cited

U.S. PATENT DOCUMENTS

| | | | | |
|---|---|---|---|---|
| 4,656,559 A | * | 4/1987 | Fathi | 361/721 |
| 5,430,609 A | * | 7/1995 | Kikinis | 361/687 |
| 5,440,450 A | * | 8/1995 | Lau et al. | 361/695 |
| 5,576,932 A | * | 11/1996 | Bishop et al. | 361/697 |
| 5,654,873 A | * | 8/1997 | Smithson et al. | 361/685 |
| 5,671,120 A | * | 9/1997 | Kikinisi | 361/687 |
| 5,712,762 A | * | 1/1998 | Webb | 361/687 |
| 5,828,549 A | * | 10/1998 | Gandre et al. | 361/695 |
| 6,061,237 A | * | 5/2000 | Sands et al. | 361/695 |
| 6,069,792 A | * | 5/2000 | Nelik | 361/687 |
| 6,088,221 A | * | 7/2000 | Bologna | 361/679.39 |
| 6,186,890 B1 | * | 2/2001 | French et al. | 454/184 |
| 6,315,655 B1 | * | 11/2001 | McEwan et al. | 454/184 |
| 6,373,696 B1 | * | 4/2002 | Bolognia et al. | 361/687 |
| 6,384,325 B1 | * | 5/2002 | Chastain et al. | 361/602 |
| 6,867,963 B2 | * | 3/2005 | Staiano | 361/687 |
| 6,876,547 B2 | * | 4/2005 | McAlister | 361/685 |
| 6,927,976 B1 | * | 8/2005 | Malone et al. | 361/687 |
| 7,011,147 B1 | * | 3/2006 | Hung | 361/697 |
| 7,158,380 B2 | * | 1/2007 | Green et al. | 361/690 |
| D541,286 S | * | 4/2007 | McClelland et al. | D14/445 |
| 7,206,201 B2 | * | 4/2007 | Behl et al. | 361/687 |
| 7,227,744 B2 | * | 6/2007 | Kitaoka | 361/685 |
| 7,269,006 B2 | * | 9/2007 | Miyamoto et al. | 361/687 |
| 7,331,379 B2 | * | 2/2008 | Chen et al. | 361/700 |
| 7,420,805 B2 | * | 9/2008 | Smith et al. | 361/679.48 |

(Continued)

*Primary Examiner*—Jayprakash N Gandhi
*Assistant Examiner*—Adrian S Wilson
(74) *Attorney, Agent, or Firm*—Raj Abhyanker, P.C.

(57) ABSTRACT

Thermal control through a channel structure is disclosed. In one embodiment, an apparatus includes devices operable at an undesired temperature relative to a desired operating temperature, a vented cover of each of devices, and a channel structure formed along a side face of each of the devices, the channel structure having any number of ridges to transfer a gas between the vented cover and an external location to the apparatus. The gas may modify an operating state of the devices from the undesired temperature to the desired operating temperature. A heat structure coupled to the vented cover and the side face may absorb a portion of an energy dissipated by at least one of the devices. A printed circuit board may be formed along an opposite face relative to the vented cover to enable the gas to escape to the external location through a cavity of the apparatus.

18 Claims, 7 Drawing Sheets

U.S. PATENT DOCUMENTS

| | | | |
|---|---|---|---|
| 2003/0030978 A1* | 2/2003 | Garnett et al. | 361/683 |
| 2003/0183373 A1* | 10/2003 | Sarraf et al. | 165/104.33 |
| 2004/0001313 A1* | 1/2004 | Yoshikara | 361/687 |
| 2004/0004813 A1* | 1/2004 | Coglitore et al. | 361/687 |
| 2004/0100765 A1* | 5/2004 | Crippen et al. | 361/687 |
| 2004/0207983 A1* | 10/2004 | Lu et al. | 361/695 |
| 2004/0252453 A1* | 12/2004 | Brooks et al. | 361/687 |
| 2005/0047087 A1* | 3/2005 | Espinoza-Ibarra et al. | 361/695 |
| 2005/0168945 A1* | 8/2005 | Coglitore | 361/695 |
| 2005/0254210 A1* | 11/2005 | Grady et al. | 361/695 |
| 2005/0259395 A1* | 11/2005 | Espinoza-Ibarra et al. | 361/695 |
| 2005/0280986 A1* | 12/2005 | Coglitore et al. | 361/687 |
| 2006/0023422 A1* | 2/2006 | Shum et al. | 361/695 |
| 2006/0039108 A1* | 2/2006 | Chikusa et al. | 361/695 |
| 2006/0061955 A1* | 3/2006 | Imblum | 361/685 |
| 2006/0148398 A1* | 7/2006 | Ruch et al. | 454/184 |
| 2006/0227505 A1* | 10/2006 | Miyamoto et al. | 361/695 |
| 2006/0232930 A1* | 10/2006 | Artman et al. | 361/695 |
| 2008/0037218 A1* | 2/2008 | Sharma et al. | 361/695 |

* cited by examiner

THERMAL CONTROL THROUGH A CHANNEL STRUCTURE

FIELD OF TECHNOLOGY

This disclosure relates generally to technical fields of storage devices and, in one embodiment, to a method and apparatus of thermal control through a channel structure.

BACKGROUND

A storage device (e.g., a hard drive) may be a peripheral unit (e.g., disk, tape and/or flash memory card) that holds data. The storage device (e.g., the hard drive) may have a storage mechanism and a carrier (e.g., a hard drive carrier) which encases the storage mechanism. The storage mechanism may include a platter, a head arm, a head actuator, and/or several other components. The head actuator may be used to operate the head arm which may be used to read/write the data on the platter. One or more of the storage device may be mounted together on a rack (e.g., single rack and/or multiple racks) to form an array.

The platter, driven by a motor, may rotate on a spindle (e.g., an axis on which the platter spins) at several thousand revolutions per minute (rpm). Rotation of the platter may generate a heat in the storage mechanism which may corrupt data stored in the storage device. In addition, the heat may damage the storage mechanism itself and other components in the storage device.

The heat in the storage device may be dissipated (e.g., cooled) using an internal fan which generates an airflow. The airflow may be directed between the storage device and another storage device adjacently held by a plane (e.g., midplane, backplane, etc.) on a rack of the array. The plane may provide electrical routings between the storage device and another storage device, and the plane may also include one or more cavities (e.g., cutouts) on a middle of the plane to provide an exit space for the airflow. The cavities on the plane may increase a pitch (e.g., a minimal distance between storage devices mounted on the rack), thereby decreasing a density of the storage devices mounted on the rack.

In addition, the cavities on the plane may lead to have long routes for electronic signals (e.g., so as to go around the cavities on the plane). Moreover, the airflow between the storage devices may cause a bad acoustic performance in each of the storage devices. (e.g., by creating a white noise, etc.). This may downgrade a quality of the data being stored in the storage device and make an operation of the array noisier.

SUMMARY

Thermal control through a channel structure is disclosed. In one aspect, an apparatus includes devices operable at an undesired temperature relative to a desired operating temperature, a vented cover of each of the devices, and a channel structure formed along a side face of each of the devices, the channel structure having any number of ridges to transfer a gas between the vented cover and an external location to the apparatus. The gas may modify an operating state of the devices from the undesired temperature to the desired operating temperature.

A heat structure coupled to the vented cover and the side face may absorb a portion of an energy dissipated by at least one of the devices. The heat structure may be formed along multiple sides of each of the devices. The heat structure may include a hollow core to channel the gas through the heat structure to a gap between adjacent ones of the ridges. A printed circuit board may be formed along an opposite face relative to the vented cover to enable the gas to escape to the external location through a cavity of the apparatus.

The printed circuit board may be carved in a saw-tooth pattern along a periphery of the printed circuit board to provide optimal escape characteristics. The printed circuit board may include a contiguous region formed in an area between adjacent ones of the devices. In addition, the devices may be electrically coupled together to form a storage array.

In another aspect, a method of forming an array structure includes forming a series of ridges along opposite faces of devices of the array structure, removing a portion of a material of a front cover associated with the array structure, and patterning a periphery of a printed circuit board of the array structure such that the a rear gap formed along the periphery aligns with a channel gap between adjacent ones of the series of ridges. The method may include attaching a heat absorber to at least one face of each of the devices to dissipate a heat produced when an electro-mechanical unit in each of the devices is operating.

In addition, the method may include bending a channeled pipe at a right angle, and positioning one portion of the channeled pipe along the front cover and another portion aligned with a gap between adjacent ones of the series of ridges. The removing the portion of the material of the front cover may form a series of vents in the front cover. Also, a printed circuit board positioned along an opposite face relative to the front cover may be patterned to enable a gas to escape to an external location when channeled from the series of vents to a cavity of the array structure behind the printed circuit board.

In yet another aspect, a system includes a network, a storage array of devices stacked flush against each other, a data processing system coupled to the storage array through the network, and a motion generator positioned in front of the storage array to direct a gas through at least one of an upper surface and a lower surface of each of the devices forming the storage array. In addition, the system may include a heat absorber coupled with the storage array to dissipate a heat produced when at least one electro-mechanical unit in the storage array is operating.

A housing may encompass the motion generator and the storage array in a single structure. A printed circuit board of the storage array may be formed with a contiguous material at a center location between adjacent ones of the devices the storage array. The printed circuit board may patterned in a saw tooth pattern along a periphery of the printed circuit board such that each indentation of the saw tooth pattern of the printed circuit board aligns with channeled gaps of the upper surface and the lower surface.

The apparatus, method, and system disclosed herein may be implemented in any means for achieving various aspects, and may be executed in a form of a machine-readable medium embodying a set of instructions that, when executed by a machine, cause the machine to perform any of the operations disclosed herein. Other features will be apparent from the accompanying drawings and from the detailed description that follows.

BRIEF DESCRIPTION OF THE DRAWINGS

Example embodiments are illustrated by way of example and not limitation in the figures of the accompanying drawings, in which like references indicate similar elements and in which.

Other features of the present embodiments will be apparent from the accompanying drawings and from the detailed description that follows.

DETAILED DESCRIPTION

Thermal control through a channel structure is disclosed. In the following description, for the purposes of explanation, numerous specific details are set forth in order to provide a thorough understanding of the various embodiments. It will be evident, however to one skilled in the art that the various embodiments may be practiced without these specific details.

Figure 1:
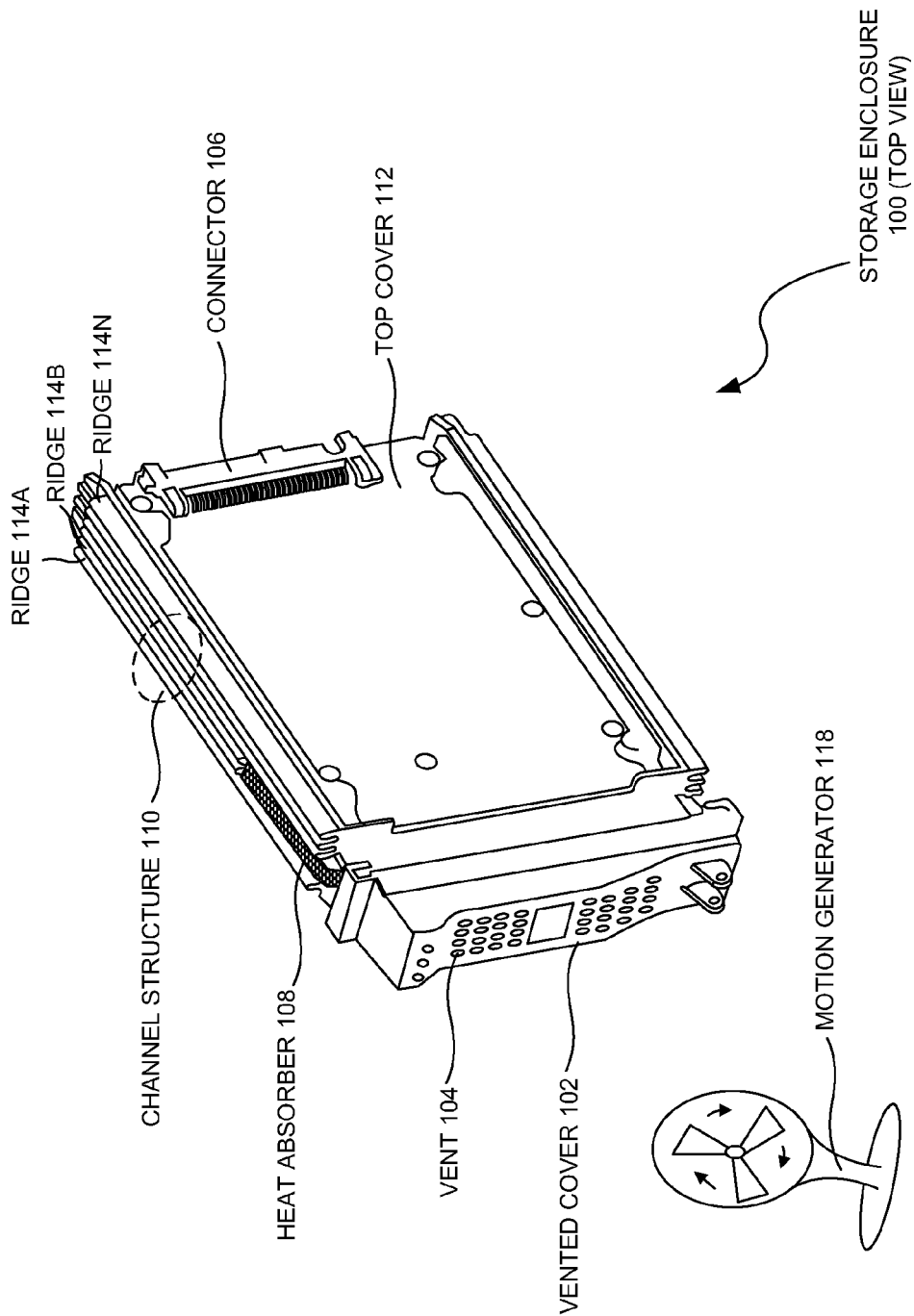
FIG. 1 is a top view of a storage enclosure having a series of ridges in a channel structure, according to one embodiment.

In one embodiment, an apparatus (e.g. a storage enclosure 100 as illustrated in FIG. 1) includes devices (e.g., one or more of a storage mechanism 202 of FIG. 2) operable at an undesired temperature relative to a desired operating temperature, a vented cover (e.g., a vented cover 102 of FIG. 1) of each of the devices (e.g., the storage mechanism 202 of FIG. 2), and a channel structure (e.g., a channels structure 110 of FIG. 1) formed along a side face of each of the devices, the channel structure having any number of ridges (e.g., ridges 114 of FIG. 1) to transfer a gas (e.g., airflow) between the vented cover and an external location to the apparatus. The gas may modify an operating state of the devices from the undesired temperature to the desired operating temperature (e.g., cool).

In another embodiment, a method of forming an array structure (e.g., high density storage device) includes forming a series of ridges (e.g., the ridges 114 of FIG. 1) along opposite faces of devices (e.g., hard drives) of the array structure (e.g., an array of storage enclosures 400 of FIG. 1), removing a portion of a material of a front cover (e.g., the vented cover 102 of FIG. 1) associated with the array structure, and patterning a periphery of a printed circuit board (e.g., midplane, backplane, etc.) of the array structure (e.g., a circuit board 304 of FIG. 4) such that the a rear gap formed along the periphery (e.g., gap between adjacent teeth of the saw-tooth pattern) aligns with a channel gap between adjacent ones of the series of ridges (e.g., parallel).

Figure 4:
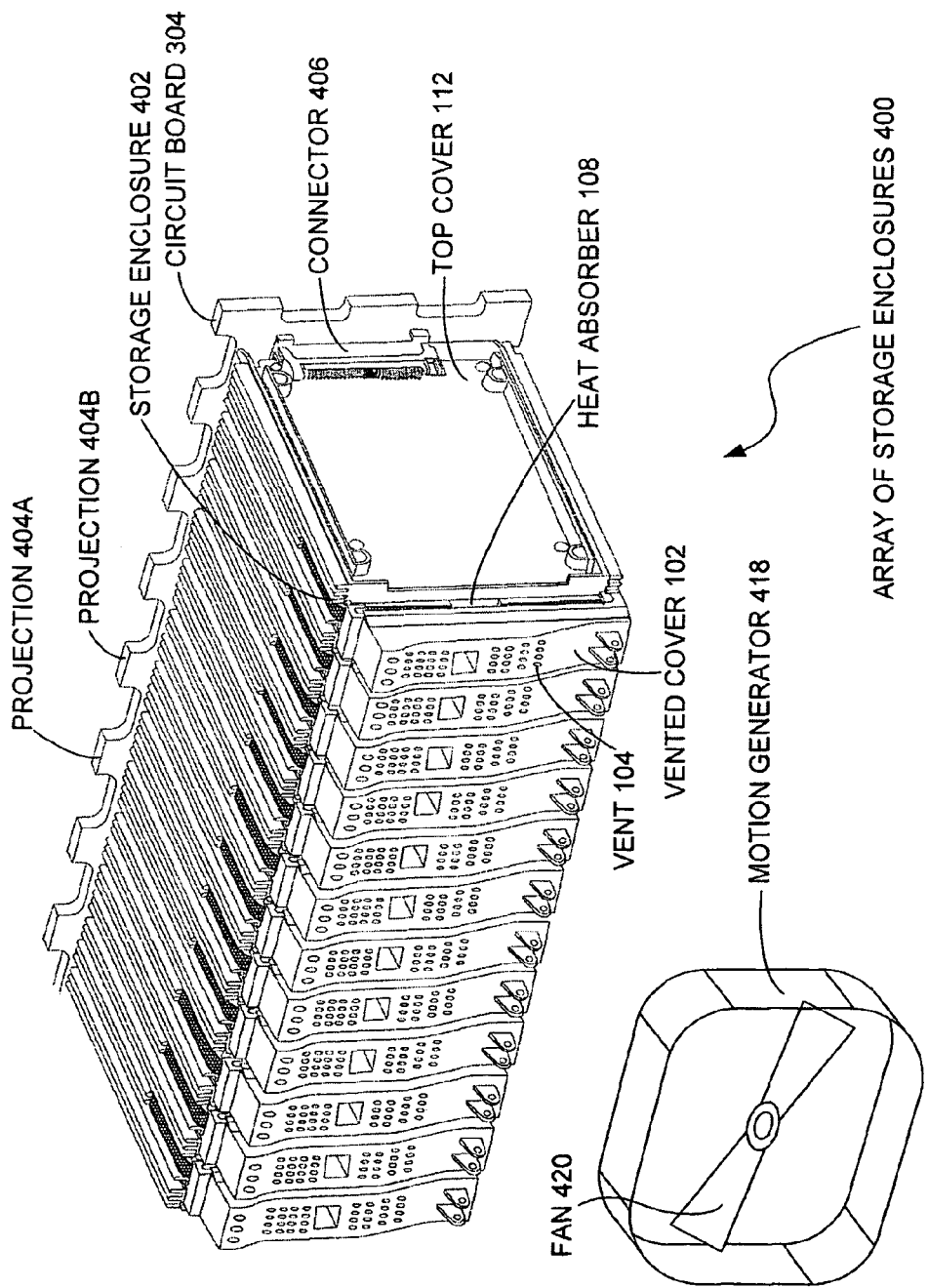
FIG. 4 is a perspective view of an array of storage enclosures, according to one embodiment.

In yet another embodiment, a system includes a network (e.g., local area network, storage area network), a storage array of devices (e.g., hard drives) stacked flush against each other e.g., as illustrated in FIG. 4), a data processing system (e.g., a data processing system 602 of FIG. 6) coupled to the storage array through the network (e.g., a network 604 of FIG. 6), and a motion generator (e.g., fan) positioned in front of the storage array (e.g., a motion generator 118 of FIG. 1) to direct a gas through at least one of an upper surface and a lower surface of each of the devices forming the storage array.

FIG. 1 is a top view of a storage enclosure 100 having a series of ridges 114A-N (e.g., parallel beams) in a channel structure 110, according to one embodiment. The storage enclosure 100 further includes a top cover 112 and a vented cover 102. A connector 106 may couple the storage enclosure 100 with other storage enclosures. A gas (e.g., airflow) may enter the storage enclosure 100 through a vent 104 (e.g., air vent) formed on the vented cover 102. The gas, positioned in between the vented cover 102 and the channel structure 110, may modify the operating state of storage enclosure 100 from an undesired to a desired temperature (e.g. cool) when the gas contacts a heat absorber 108 (e.g., heat pipe, thermal insulating material, etc). Any one of the series of ridges 114A-N may transfer the gas though the channel structure 110 to an external location (e.g., rear of the storage enclosure). A motion generator 118 (e.g., a fan) may be used to control the velocity of the gas. In one embodiment, the storage enclosure 100 may be coupled to other storage enclosures to form the array of storage enclosures 400 in FIG. 4.

Figure 2:
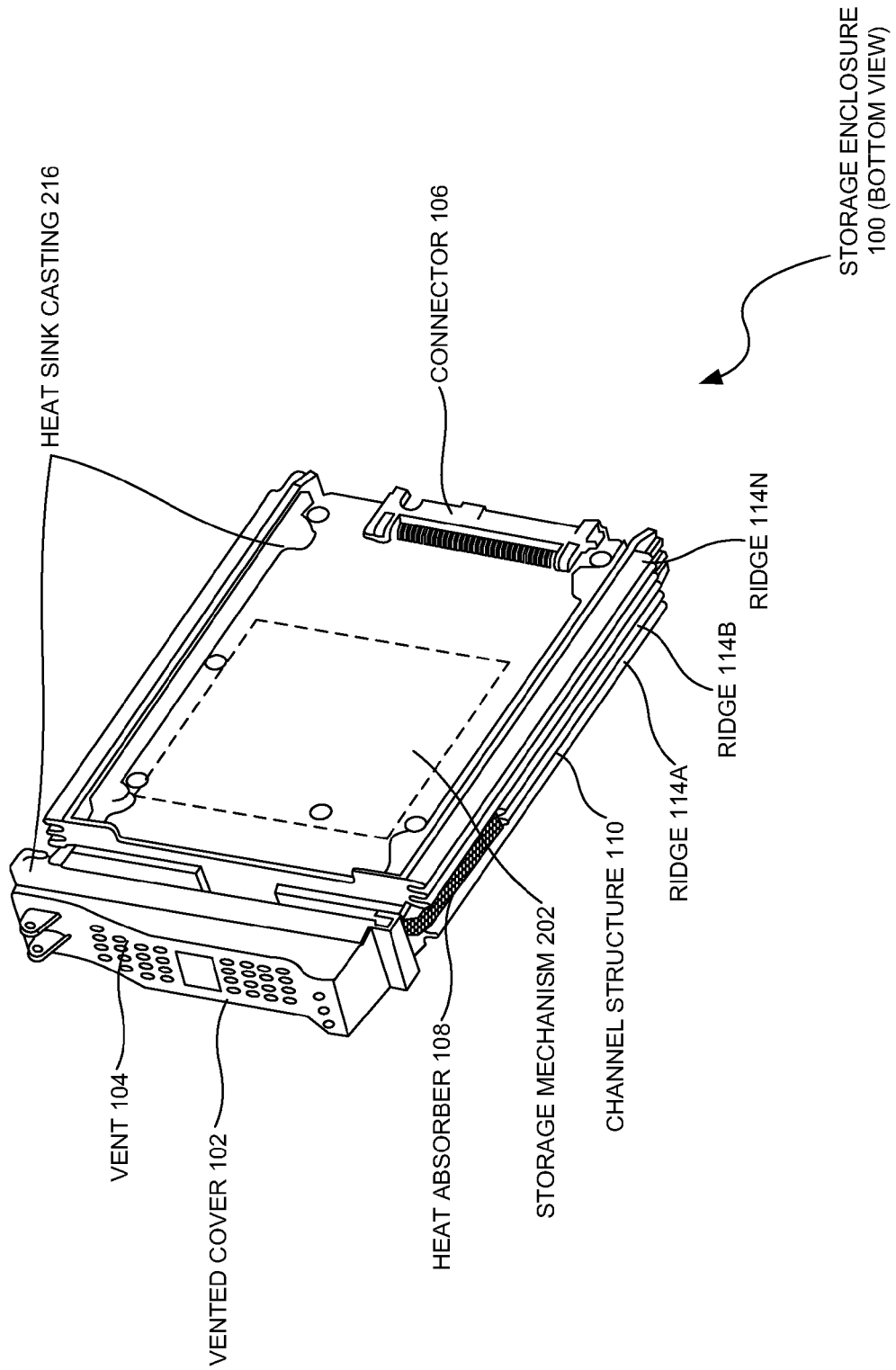
FIG. 2 is a bottom view of the storage enclosure of FIG. 1, according to one embodiment.

FIG. 2 is a bottom view of the storage enclosure 100 of FIG. 1, according to one embodiment. A storage mechanism 202 (e.g. disk, tape, flash memory, etc.) may be housed by the storage enclosure 100. For example, FIG. 2 illustrates that the heat absorber 108 and/or the channel structure 110 may be formed on both an upper surface and/or a lower surface of the storage enclosure 100.

Figure 3:
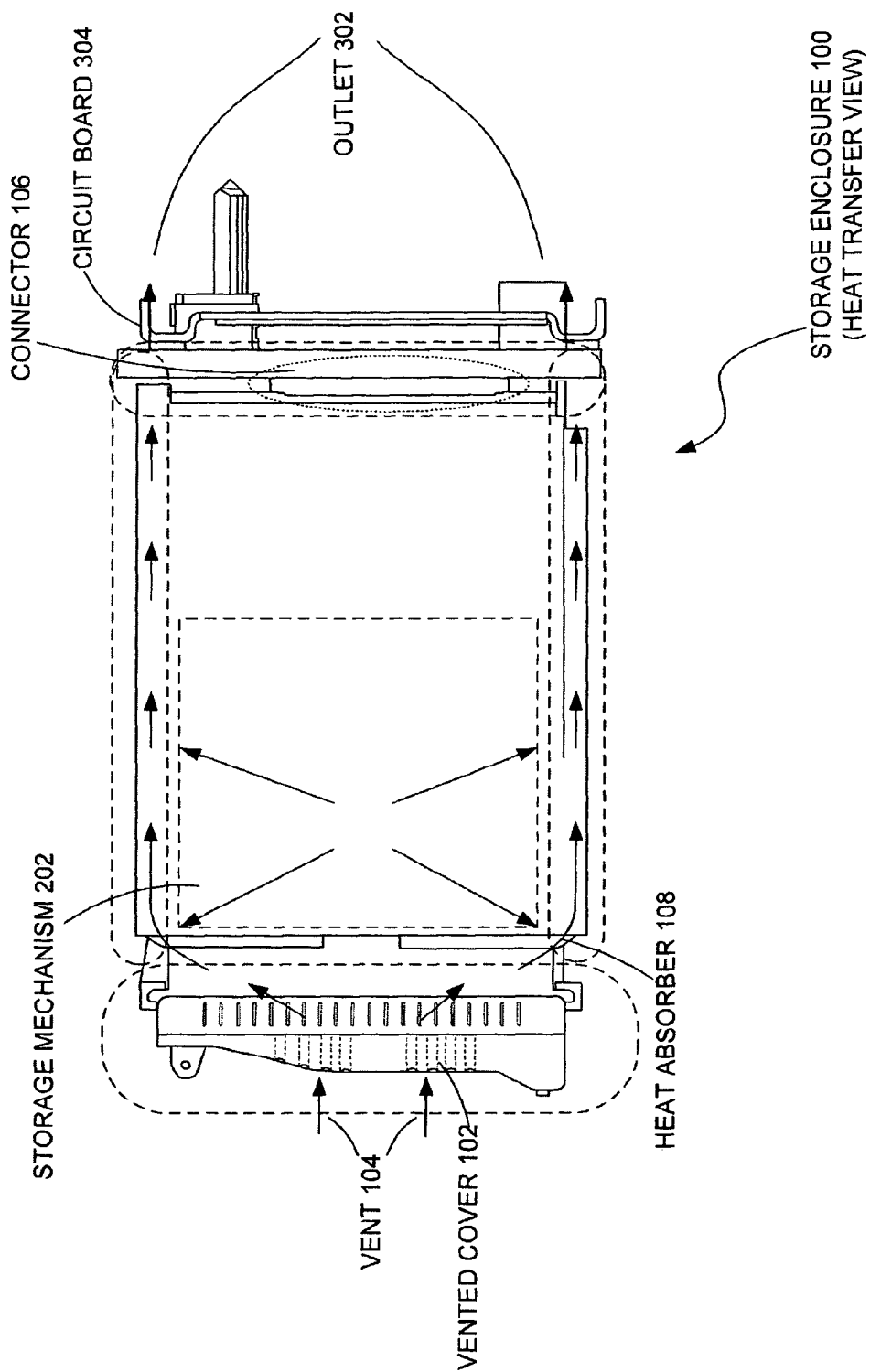
FIG. 3 is a heat transfer view of the storage enclosure of FIG. 1 coupled to a circuit board, according to one embodiment.

FIG. 3 is a heat transfer view of the storage enclosure 100 of FIG. 1 coupled to a circuit board 304 (e.g., backplane, midplane, etc.) through a connector 106, according to one embodiment. A gas (e.g., an airflow) may enter the storage enclosure 100 via the vented cover 102 defined by a series of the vent 104 (e.g., air vents). The gas contacts a heat absorber 108, which absorbs a heat produced by the operation of the storage mechanism 202. The gas may modify an operating state of the storage enclosure 100 from the undesired temperature to the desired operating temperature (e.g., cool).

The series of ridges 114A-N of the channel structure 110 may transfer the gas between the heat absorber 108 and the vented cover 102 to an outlet 302 and an external location (e.g., back of the circuit board). In one embodiment, the circuit board 304 may be patterned such that a cavity forms on the periphery and aligns with the series of ridges 114A-N. In another embodiment, the outlet 302 may be a path from the channel structure 110 to the cavity formed on a periphery of the circuit board 304 and out to an external location.

FIG. 4 is a perspective view of an array of storage enclosures 400, according to one embodiment. The array of storage enclosures 400 is formed by at least one storage enclosure 402 having a connector 406 coupled to the circuit board 304. The circuit board 304 may be patterned such that a series of projections 404A-N (saw-tooth pattern) is formed along the periphery. A motion generator 418 (e.g., a fan) may generate a gas (e.g., an airflow) between an external location and the vented cover 102. The gas may enter the storage enclosure 402 via the vented cover 102. The gas may contact the heat absorber 108 and may modify the operating state of the storage enclosure 402 from an undesired to a desired temperature (e.g., cool). The gas may be transferred from the heat absorber 108 to the circuit board 304 through the series of ridges 114A N formed on the channel structure 110. The gas may exit the array of storage enclosures 400 via a gap formed by any two adjacent projections of the series of projections 404A-N. In one embodiment, the array of storage enclosures 400 may be integrated into the system of FIG. 6.

Figure 5:
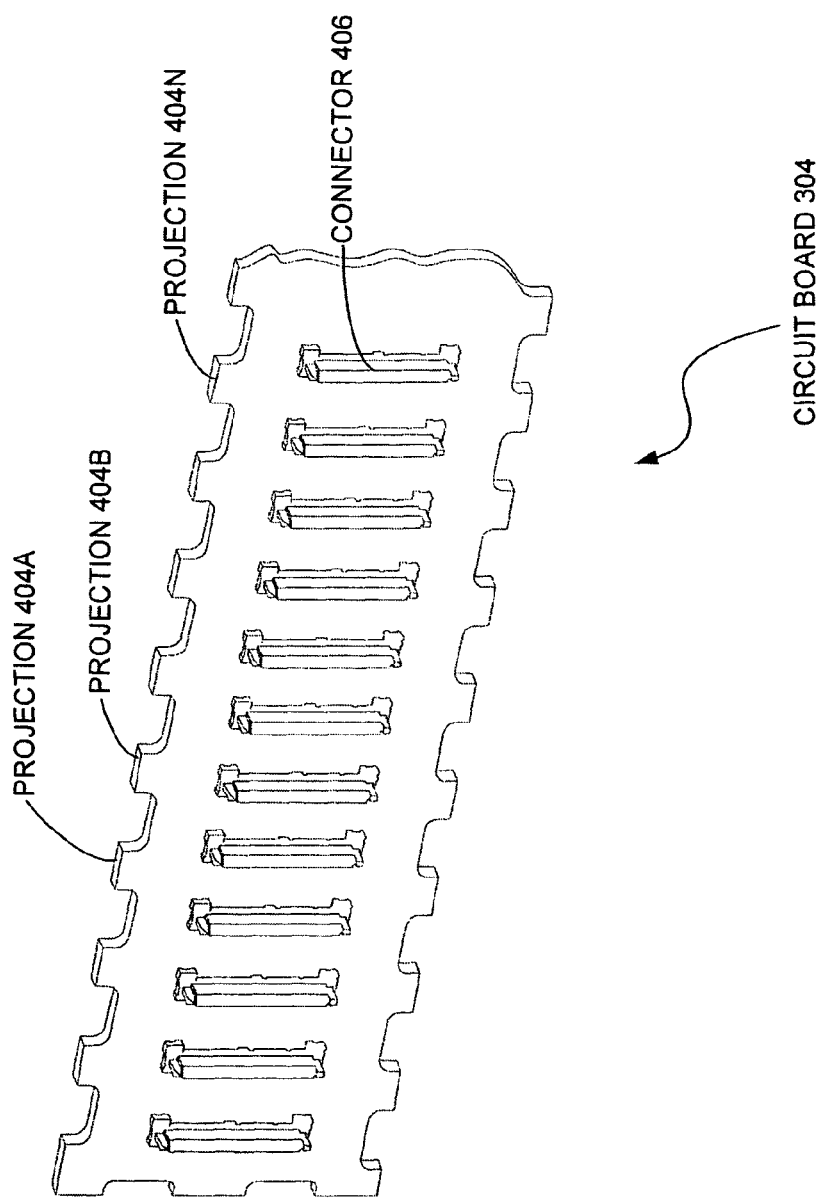
FIG. 5 is a perspective view of the circuit board of FIG. 3, according to one embodiment.

FIG. 5 is a perspective view of the circuit board of FIG. 3, according to one embodiment. A circuit board 304 (e.g., backplane, midplane, etc.) includes a series of connectors 406A-N (e.g., hard drive connectors) and a series of projections 404A-N (e.g., saw-tooth pattern) formed along a periphery. The circuit board 304 further includes a contiguous region between each pair of adjacent connectors of the series of connectors 406A-N. Each pair of adjacent projections of the series of projections 404A-N defines a cavity in order to enable the escape of a gas (e.g., airflow).

Figure 6:
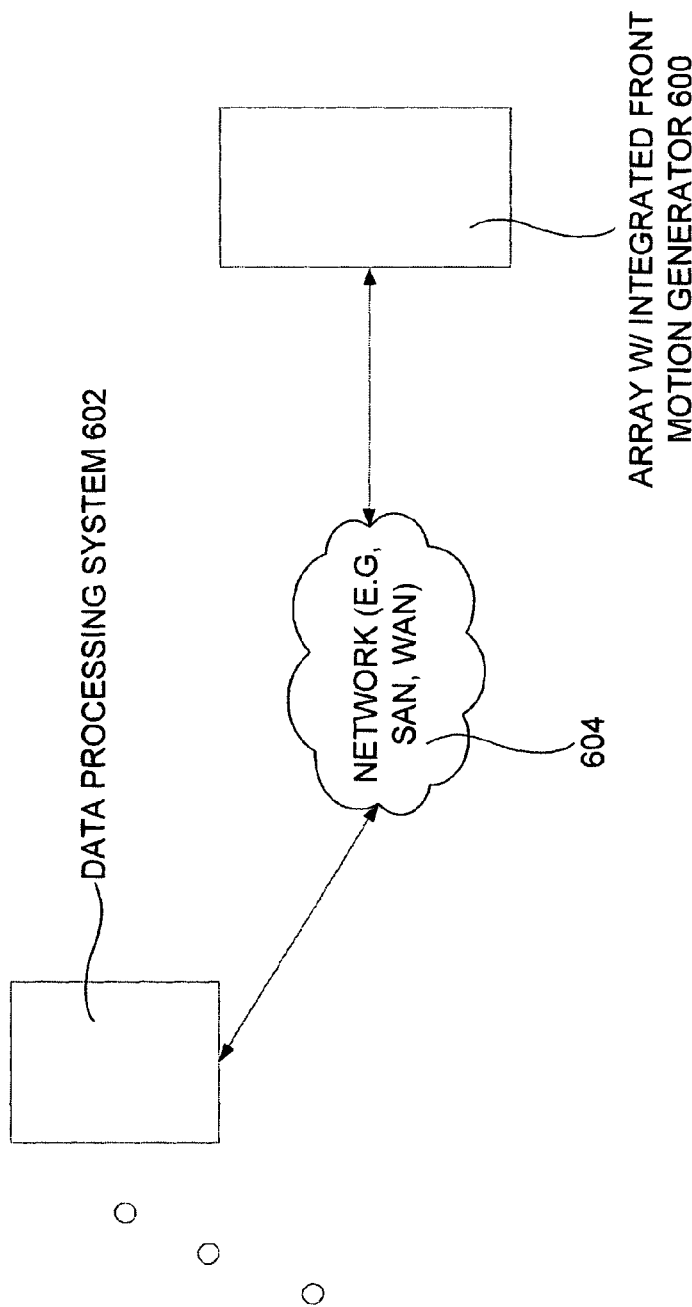
FIG. 6 is a network view of an array with an integrated front motion generator coupled to a data processing system through a network, according to one embodiment.

FIG. 6 is a network view of an array with an integrated front motion generator 600 coupled to a data processing system 602 through a network 604 (e.g., SAN, LAN, WAN, etc.), according to one embodiment. The array 600 may communicate (e.g., send/receive data (e.g. bits)) with the data processing system 602 through the network 604. In one embodiment, the network 604 may be the Internet. The data processing system 602 may receive data stored on the array 600. The data processing system 602 may modify and/or translate the data. The data processing system 602 may send the data through the network 604 to be stored in the array 600.

Figure 7:
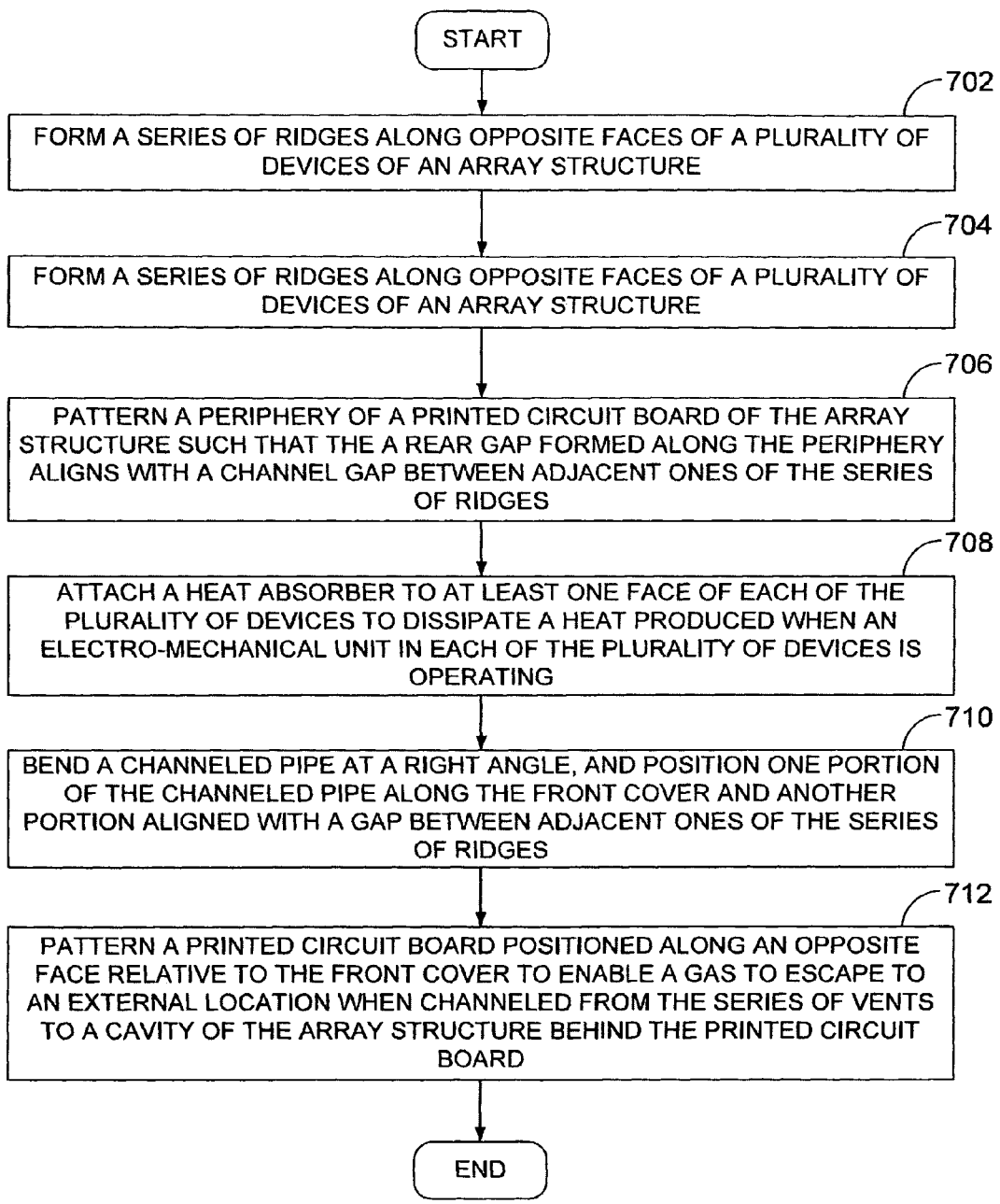
FIG. 7 is a process flow of forming a series of ridges along opposite faces of a plurality of devices of an array structure, according to one embodiment.

FIG. 7 is a process flow of manufacturing an array structure (e.g., array of storage devices). In operation 702, a series of ridges may be formed along opposite faces of a plurality of devices (e.g., hard drives) of an array structure, according to one embodiment. In operation 704, a vent (e.g., air vent) on the front cover may be formed when a material is removed. Then, in operation 706, a periphery of a printed circuit board (e.g., midplane, backplane, etc.) may be patterned such that a rear gap formed along the periphery aligns with a channel gap between adjacent ones of the series of ridges. A heat may be produced when an electro-mechanical unit in each of the plurality of devices operates.

In operation 708, a heat absorber (e.g., heat pipe, thermal insulating material, etc.) can be attached to at least one face of each of the plurality for dissipating the heat. In operation 710, a channeled pipe can be bent at a right angle where one portion is positioned along the front cover and the other portion is positioned in between adjacent ones of the series of ridges. In operation 712, a printed circuit board can be patterned such that the printed circuit board can be positioned along an opposite face relative to the front cover to enable a gas to escape to an external location when channeled from the series of vents to a cavity of the array structure behind the printed circuit board.

Although the present embodiments have been described with reference to specific example embodiments, it will be evident that various modifications and changes may be made to these embodiments without departing from the broader spirit and scope of the various embodiments. For example, the method described in FIG. 7 may be enabled and operated using hardware circuitry (e.g., CMOS based logic circuitry), firmware, software and/or any combination of hardware, firmware, and/or software (e.g., embodied in a machine readable medium). In addition, while a 'storage enclosure' is described herein (e.g., the storage enclosure 100), it should be noted that the structure, methods, operations, and forms described herein may be applicable to any structural, electrical, chemical, physical, and/or mechanical environment that requires a thermal controlled condition and/or which may require alteration of a temperature condition (e.g., a gas chamber, a reactor, a generator, a motor, a thermo-chemical core, an electrical and/or mechanical structure generating heat, etc.).

In addition, it will be appreciated that the various operations, processes, structures, and methods disclosed herein may be embodied in a machine-readable medium and/or a machine accessible medium compatible with a data processing system (e.g. a computer system), and may be performed in any order (e.g., including using means for achieving the various operations). Accordingly, the specification and drawings are to be regarded in an illustrative rather than a restrictive sense.

What is claimed is:

1. An apparatus comprising:
   a plurality of devices operable at an undesired temperature relative to a desired operating temperature;
   a vented cover of each of the plurality of devices; and
   a channel structure formed along a side face of each of the plurality of devices, the channel structure having a plurality of ridges to transfer a gas between the vented cover and an external location to the apparatus, wherein a printed circuit board formed along an opposite face relative to the vented cover to enable the gas to escape to the external location through a cavity of the apparatus, wherein the printed circuit board is carved in a saw-tooth pattern along a periphery of the printed circuit board to provide optimal escape characteristics.

2. The apparatus of claim 1 wherein the gas is used to modify an operating state of the plurality of devices from the undesired temperature to the desired operating temperature.

3. The apparatus of claim 1 further comprising a heat structure coupled to the vented cover and the side face to absorb a portion of an energy dissipated by at least one of the plurality of devices.

4. The apparatus of claim 3 wherein the heat structure is formed along multiple sides of each of the plurality of devices.

5. The apparatus of claim 4 wherein the heat structure includes a hollow core to channel the gas through the heat structure to a gap between adjacent ones of the plurality of ridges.

6. The apparatus of claim 1 further comprising the printed circuit board formed along the opposite face relative to the vented cover to enable the gas to escape to the external location through the cavity of the apparatus.

7. The apparatus of claim 6 wherein the printed circuit board is carved in the saw-tooth pattern along the periphery of the printed circuit board to provide optimal escape characteristics.

8. The apparatus of claim 7 wherein the printed circuit board includes a contiguous region formed in an area between adjacent ones of the plurality of devices.

9. The apparatus of claim 1 wherein the plurality of devices are electrically coupled together to form a storage array.

10. A method of forming an array structure, comprising:
    forming a series of ridges along opposite faces of a plurality of devices of the array structure;
    removing a portion of a material of a front cover associated with the array structure; and
    patterning a periphery of a printed circuit board of the array structure such that a rear gap formed along the periphery aligns with a channel gap between adjacent ones of the series of ridges, and wherein the printed circuit board is carved in a saw-tooth pattern along a periphery of the printed circuit board to provide optimal escape characteristics.

11. The method of claim 10 further comprising attaching a heat absorber to at least one face of each of the plurality of devices to dissipate a heat produced when an electromechanical unit in each of the plurality of devices is operating.

12. The method of claim 10 further comprising bending a channeled pipe at a right angle; and positioning one portion of the channeled pipe along the front cover and another portion aligned with a gap between adjacent ones of the series of ridges.

13. The method of claim 10 wherein the removing the portion of the material of the front cover forms a series of vents in the front cover.

14. The method of claim 13 further comprising patterning a printed circuit board positioned along an opposite face relative to the front cover to enable a gas to escape to an external location when channeled from the series of vents to a cavity of the array structure behind the printed circuit board.

15. The method of claim 14 wherein the printed circuit board is carved in a saw tooth pattern along a periphery of the printed circuit board to provide optimal escape characteristics, and wherein the printed circuit board includes a contiguous region formed in an area between adjacent ones of the plurality of devices.

16. A system, comprising:
   a network;
   a storage array of devices stacked flush against each other;
   a data processing system coupled to the storage array through the network;
   a motion generator positioned in front of the storage array to direct generate gas flow into the devices by controlling the velocity of the gas through at least one of an upper surface and a lower surface of each of the devices forming the storage array;
   a connector to couple each device of the storage array of devices with other devices of the storage array of devices; and
   a printed circuit board of the storage array formed with a contiguous material at a center location between adjacent ones of the devices of the storage array, wherein the printed circuit board is patterned in a saw-tooth pattern along a periphery of the printed circuit board.

17. The network of claim 16 further comprising a heat absorber coupled with the storage array to dissipate a heat produced when at least one electro-mechanical unit in the storage array is operating.

18. The network of claim 16 further comprising a housing that encompasses the motion generator and the storage array in a single structure.

* * * * *